(12) United States Patent
Müller et al.

(10) Patent No.: US 7,418,885 B2
(45) Date of Patent: Sep. 2, 2008

(54) DEVICE FOR DRIVING A PLURALITY OF HYDRAULIC SHIFT CYLINDERS AND HYDRAULIC SUPPLY SYSTEM FOR A TWIN-CLUTCH TRANSMISSION

(75) Inventors: Eric Müller, Kaiserslautern (DE); Manfred Homm, Bühl-Neusatz (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 234 days.

(21) Appl. No.: 10/908,390

(22) Filed: May 10, 2005

(65) Prior Publication Data

US 2005/0252326 A1 Nov. 17, 2005

(30) Foreign Application Priority Data

| May 15, 2004 | (DE) | ........................ 10 2004 024 310 |
| Sep. 3, 2004 | (DE) | ........................ 10 2004 042 641 |
| Dec. 22, 2004 | (DE) | ........................ 10 2004 062 984 |

(51) Int. Cl.
*F16H 59/00* (2006.01)
*F16H 61/00* (2006.01)
*F16H 63/00* (2006.01)
*F16K 31/00* (2006.01)
*G05D 13/10* (2006.01)

(52) U.S. Cl. ............................. 74/335; 137/51; 251/289

(58) Field of Classification Search ................... 74/335; 251/129.01, 289; 137/47, 51
See application file for complete search history.

(56) References Cited

U.S. PATENT DOCUMENTS

| 4,094,144 | A | * | 6/1978 | Italy et al. ..................... 60/445 |
| 4,632,234 | A | * | 12/1986 | Bardoll et al. ............. 192/3.58 |
| 4,653,353 | A | * | 3/1987 | Itoh et al. ..................... 477/49 |
| 4,662,248 | A | * | 5/1987 | Greenwood ................. 475/115 |
| 4,790,216 | A | * | 12/1988 | Eggert et al. .................. 477/38 |
| 5,134,903 | A | * | 8/1992 | Itoh ............................ 74/335 |
| 5,697,865 | A |   | 12/1997 | Jang |
| 5,876,303 | A |   | 3/1999 | Yu |
| 6,120,406 | A |   | 9/2000 | Redlinger et al. |
| 6,626,793 | B1 | * | 9/2003 | Greenwood ................. 476/10 |
| 2001/0053728 | A1 |   | 12/2001 | Kim et al. |

FOREIGN PATENT DOCUMENTS

| DE | 10102030 A | * | 9/2001 |
| DE | 10143929 |   | 3/2002 |
| GB | 2163224 A | * | 2/1986 |

* cited by examiner

*Primary Examiner*—Tisha D Lewis
(74) *Attorney, Agent, or Firm*—Simpson & Simpson, PLLC

(57) ABSTRACT

A device for driving a plurality of hydraulic shift cylinders, especially shift cylinders for shifting gears of a twin-clutch transmission, includes a first slide valve having a control intake to which control pressure is applied, a system pressure intake to which system pressure is applied, two outlets and at least one return outlet, the one outlet being connected to the system pressure intake and the other outlet being connected to the return outlet, as desired, and a valve device connected to the outlets of the slide valve via which the shift cylinders may be selectively actuated.

12 Claims, 6 Drawing Sheets

DEVICE FOR DRIVING A PLURALITY OF HYDRAULIC SHIFT CYLINDERS AND HYDRAULIC SUPPLY SYSTEM FOR A TWIN-CLUTCH TRANSMISSION

CROSS-REFERENCE TO RELATED APPLICATION

This patent claims priority of German Patent Applications Nos. 10 2004 024 310.7, filed May 15, 2004, 10 2004 042 641.4, filed Sep. 3, 2004, and 10 2004 062 984.6, filed Dec. 22, 2004, which applications are incorporated herein by reference.

BACKGROUND OF THE INVENTION

The invention relates to a device for driving a plurality of hydraulic shift cylinders, especially shift cylinders for shifting gears of a twin-clutch transmission. The invention further relates to a hydraulic supply system for a twin-clutch transmission containing such a device.

An electro-hydraulic transmission control device with which hydraulic pressure may be applied to shift cylinders present on clutches, brakes and/or shift mechanisms of an automatic transmission is known from German Patent Application 101 439 29 A1. The components of the transmission control device are attached to a modular body in which flow paths are formed. Control valves that are mounted on the module body and configured, for example, as slide valves guide hydraulic fluid through the flow paths. The control valves are controlled by solenoid valves that are likewise mounted on the module body.

The structure of such transmission control devices is relatively complex. In particular, a plurality of control or slide valves and, for example, electromagnetically actuated control devices, is required to drive the positioning cylinders.

OBJECT OF THE INVENTION

The object of the invention is to create a device, simple in its structure, for driving a plurality of hydraulic shift cylinders, especially for driving shift cylinders for shifting gears of a twin-clutch transmission.

BRIEF SUMMARY OF THE INVENTION

This objective is achieved using a device for driving a plurality of hydraulic shift cylinders, especially shift cylinders for shifting gears of a twin-clutch transmission, the device including: a first slide valve having a control intake to which control pressure is applied, a system pressure intake to which system pressure is applied, two outlets and at least one return outlet, the one outlet being connected to the system pressure intake and the other outlet being connected to the return outlet, as desired, and a valve device connected to the outlets of the slide valve by means of which the shift cylinders may be selectively actuated.

Different individual possibilities for the structure of the device according to the invention are opened up by the first slide valve, which is generally configured as a 4-by-3-way valve, and the valve device connected to this slide valve.

In a first advantageous embodiment of the device according to the invention, the valve device is formed by slide valves having intakes and outlets and slides that can be moved into a first or second position as a function of control pressure being applied, two outlets being assigned to each intake of a slide valve, the one in the first position of the slide and the other in the second position of the slide being connected to the intake, these slide valves being disposed as steps one behind the other in a cascade configuration in such a manner that an intake of a slide valve of a subordinate step is connected to an outlet of a slide valve of the preceding step, the first slide valve forming the first step and the outlets of the slide valves of the last step each being connected to a shift cylinder, and control devices being provided, of which each one is assigned to the slide valves of a step, so that control pressure may be applied to all slide valves of a step simultaneously.

In this way it is achieved that each shift cylinder does not need to be assigned its own control device, so that with a number of control devices that corresponds just to the number of steps, each one of the hydraulic shift cylinders, whose number is greater than that of the control devices, may selectively be shifted or actuated.

Advantageously, the second step of the cascade includes a slide valve having two intakes and four outlets and a third step includes two slide valves, each having two intakes and four outlets, etc. In this way $2^n$ shift cylinders may be selectively actuated using n control devices.

Advantageously, at least a few of the control devices are formed by electromagnetically operated control valves.

In this context a pilot pressure line is preferably connected via a throttle having a connection line between a control valve and a control chamber of a slide valve.

In a device according to the invention for driving a plurality of hydraulic shift cylinders for shifting gears of a twin-clutch transmission, the outlets of the third step that are connectable to the intake of the slide valve of the second step are advantageously connected to shift cylinders with which a first group of gears of the twin clutch transmission may be shifted, and the outlets of the third step that are connectable to the other intake of the slide valve of the second step are connected to shift cylinders with which a second group of gears may be shifted.

In a preferred embodiment of the aforementioned device, the control device for the actuation of the slide valve of the second step is formed via a connection of a control chamber of the slide valve to an hydraulic line via which one of the clutches of the twin-clutch transmission is operable by application of pressure.

In a further embodiment of the device according to the present invention, two opposite-acting shift cylinders are combined to form a shift assembly for an actuator, the valve device includes a multi-port valve to which control pressure is applicable and which has individual outlets, each assigned to one of the shift cylinders of a shift assembly, and a shared outlet assigned to all of the other shift cylinders of the actuation assemblies as a group, and the multi-port valve selectively guides the system pressure to one of the individual outlets depending on the position of the first slide valve and thereby connects all other shift cylinders to the return outlet or selectively connects one of the individual outlets to the return outlet and thereby applies the system pressure to all other outlets.

Advantageously, the aforementioned valve device includes a rotary slide valve whose rotary slide selectively connects an intake connected to a first outlet of the first slide valve to one of the individual outlets and its shared outlet simultaneously forms the other intake of the rotary slide valve that is connected to the other outlet of the first slide valve.

An hydraulic supply system for a twin-clutch transmission having a device of the aforementioned type includes a line to which pressure from a pump may be applied and which is connected to a pressure control valve, which has a control pressure connection for the connection of a control pressure line that is connected to the control devices, and a return connection, which is connected to a return line via a cooling line that runs through a cooling apparatus, a bypass line, which connects the cooling line to the return line, and a pressure-limiting valve disposed in the bypass line that opens the flow cross-section of the bypass line increasingly as the back pressure at the cooling apparatus increases.

Advantageously, at least a portion of the hydraulic fluid flowing through the return line is used to cool the clutches.

The invention is generally applicable where a plurality of selectively driven shift cylinders, hydraulic valves, etc. is needed in order to control the operation of subordinate units.

BRIEF DESCRIPTION OF THE DRAWINGS

The invention is explained below in reference to exemplary diagrammatic drawings and with further details.

DETAILED DESCRIPTION OF THE INVENTION

Figure 1:
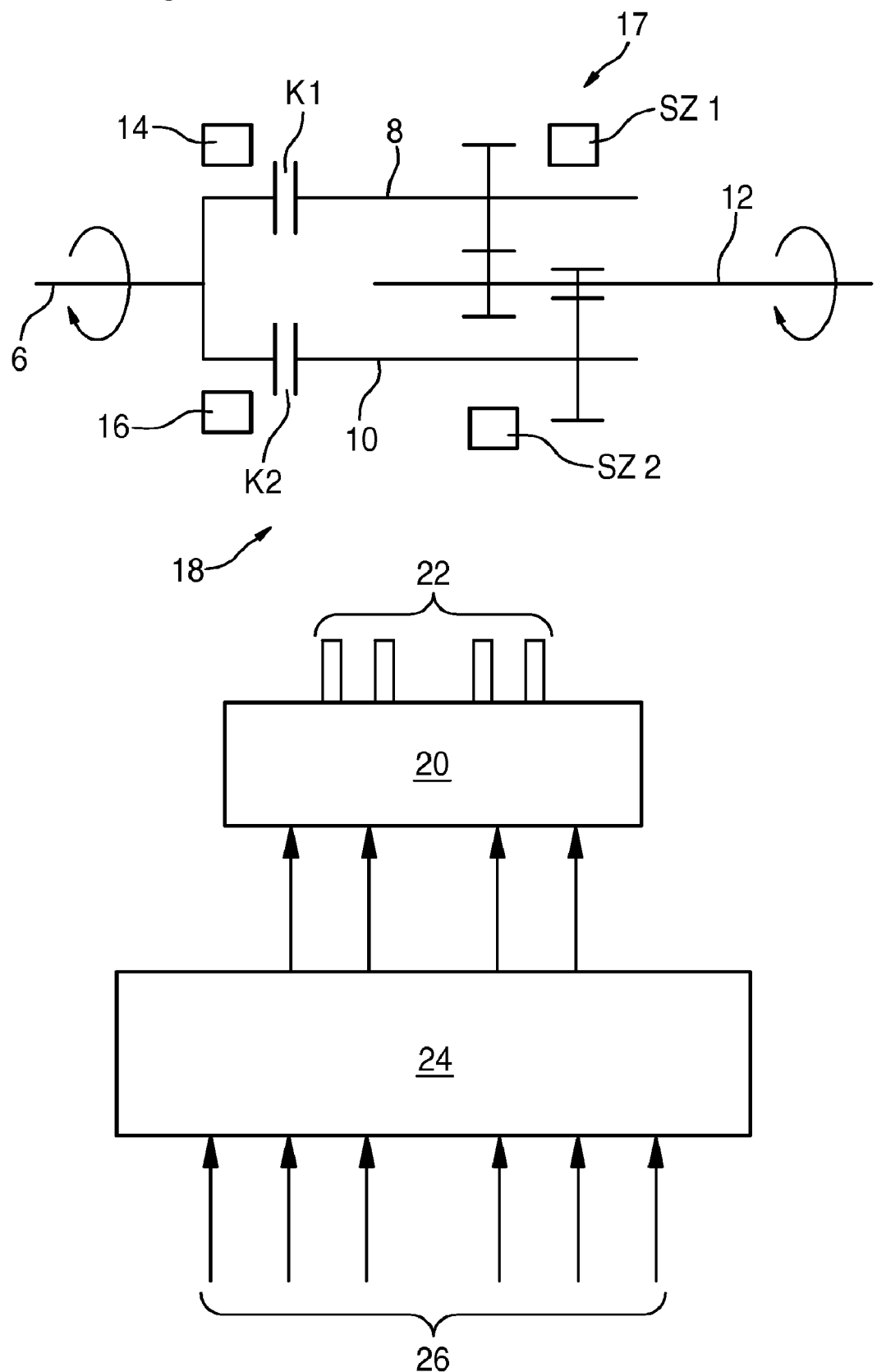
FIG. 1 shows a basic sketch of a twin-clutch transmission having a control device.

According to FIG. 1, a twin-clutch transmission has a drive shaft 6 that is driven, for example, by an internal combustion engine and is rotationally fixedly connected to two input shafts 8 and 10. The torque flow from drive shaft 6 into input shafts 8 and 10 is controllable as desired via a clutch K1 and K2, respectively. Between input shaft 8 and an output shaft 12, different ratios may be selected via gear pairs, of which only one is depicted. Likewise, between intake shaft 10 and output shaft 12, different gear pairs may be selected, of which only one is depicted. Positioning cylinders 14 and 16 are provided for the actuation of clutches K1 and K2. Positioning cylinders SZ1 and SZ2 are provided for shifting the gear pairs, for example, to produce a rotationally fixed connection between the gears disposed on input shaft 8 or 10 with the particular input shaft 8 or 10, which meshes with a particular gear that is continuously rotationally fixedly connected to the output shaft.

The gearwheels disposed on input shaft 8 are, for example, gears with which an even gear as well as a reverse gear are selected. Gearwheels with which a particular odd gear is selected are connected to input shaft 10. Thus, the twin clutch transmission comprises two partial transmissions, designated as whole units with the reference characters 17 and 18, which operate using a common output shaft 12 and of which, for example, the one includes the even gears and the reverse gear and the other the odd gears.

The structure and function of such a twin clutch transmission are known in and of themselves and are therefore not explained.

An electrohydraulic assembly group 20, which includes an hydraulic pressure supply, hydraulic lines, valves for switching the lines and electrically operated valves, is used to drive the positioning and shift cylinders.

Hydraulic outlet lines 22 of electrohydraulic assembly 20 are connected to the positioning cylinders. Electrical inputs of the electrohydraulic assembly that are connected to the magnets of solenoid valves are connected to outputs of an electronic control device 24 whose inputs 26 are connected to sensors whose output signals determine the actuation of the twin clutch transmission according to prescribed programs stored in control device 24.

Figure 2:
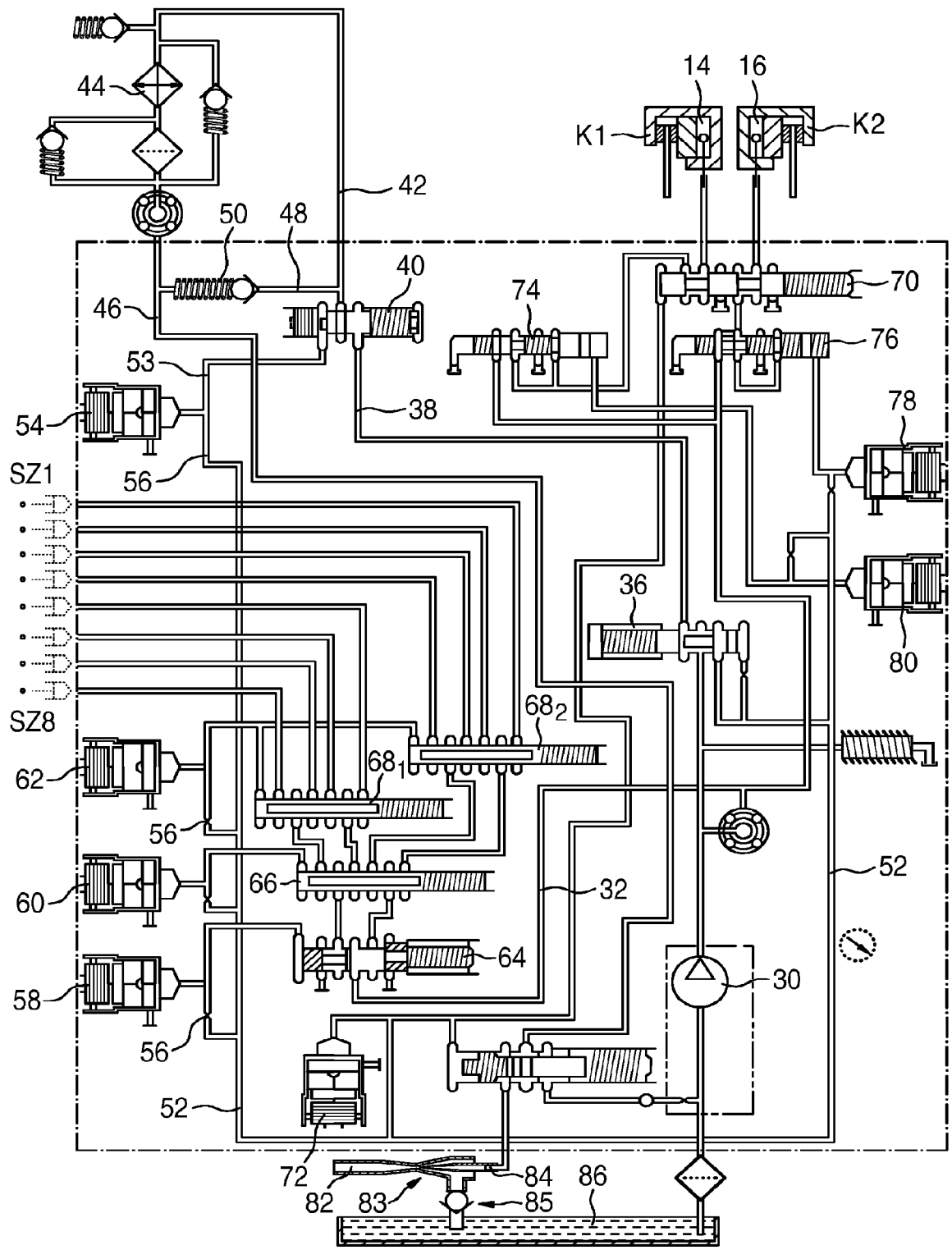
FIG. 2 shows a circuit diagram of a first embodiment of an hydraulic system for the actuation of a twin clutch transmission.

FIG. 2 shows a first embodiment of electrohydraulic assembly 20, only the components of the electrohydraulic assembly that are essential to the invention being explained below.

According to FIG. 2, a pump 30 produces a system pressure in a line 32 and in a line 38 that is routed through a pilot pressure valve 36, a pilot pressure being derived from the system pressure by means of pilot pressure valve 36 in a line 52. System pressure line 38 is connected to an intake of a pressure control valve 40, which has a return outlet and a control connection. A cooling line 42, which leads to a cooling apparatus 44 whose outlet is connected to a return line 46, is connected to the return outlet. A bypass line 48 connects cooling line 42 to return line 46 upstream from cooling apparatus 44. Disposed in bypass line 48 is a pressure-limiting valve 50, which opens increasingly if the pressure in cooling line 42 exceeds the pressure in return line 46.

The control connection of pressure control valve 40 is connected to a line 53 from which a line branches off to a pressure control valve 54, which is preferably configured as an electromagnetically actuated proportional valve and connects line 53 to the return according to its actuation. Line 53 is connected via a throttle 56 to pilot pressure line 52. The system pressure is adjusted via pressure control valve 40 with the aid of control valve 54.

Different lines—each of which is connected to intakes of control valves 58, 60 and 62, with throttles 56 being disposed in between them and open out into control chambers of slide valves 64, 66 and $68_1$ and $68_2$—branch off from pilot pressure line 52.

Control valve 58 is preferably configured as an electromagnetically actuated proportional valve. Control valves 60 and 62 are preferably simple on/off valves. Pilot pressure line 52 is connectable to a return according to the cross-section opened by the control valves, so that the pressure in the particular control chamber drops.

The slide valves each contain a slide, having one face to which hydraulic control pressure is applied and another face that acts against a spring. The slide housings each have intakes and outlets, one intake being connected to one of two outlets assigned to it depending on the position of the slide. As is evident from FIG. 2, slide valve 64 has two outlets, the system pressure prevalent in line 32 being applied to the left one when the control chamber is depressurized and the system pressure being applied to the right one when a correspondingly high control pressure is applied to the control chamber. Of course, the pressure passed on by the slide valve in each case is a function of the level of control pressure. The two outlets of slide valve 64 are connected to two intakes of slide valve 66, which has four outlets, of which the two left ones are connected to intakes of slide valve $68_1$ and the two right ones are connected to intakes of slide valve $68_2$. Slide valves $68_1$ and $68_2$ have four outlets, of which each of the two left ones is assigned to the left intake and the two right ones are assigned to the right intake. The outlets of slide valves $68_1$ and $68_2$, which total eight, are connected to positioning cylinders SZ1 to SZ8 with which gears of the twin-clutch transmission (FIG. 1) are shifted.

The shift valves are therefore disposed one behind the other in three steps in the manner of a cascade, shift valve 64 forming the first step, shift valve 66 forming the second step and slide valves $68_1$ and $68_2$ forming the third step. Of course, slide valves $68_1$ and $68_2$ could be combined into one slide valve, which would have to be configured accordingly long, or slide valves 66 and 68 could each be formed by two slide valves corresponding to slide valve 64.

As is evident without further explanation, pressure may be selectively applied to each individual positioning cylinder SZ1 to SZ8 via corresponding actuation of control valves 58, 60 and 62. If, for example, pressure is to be applied to positioning cylinder SZ1, all control valves must be closed so that pressure is applied to the control chambers of all slide valves. System pressure is applied to shift cylinder SZ7, for example, if the control chamber of slide valve 64 is depressurized, the control chamber of slide valve 66 is depressurized and the control chamber of slide valve $68_1$ is pressurized.

Therefore, it is possible in the described arrangement to selectively drive eight positioning cylinders using only three control valves 58, 60 and 62.

The operation of pressure-limiting valve 50 is as follows:

If the flow resistance of cooling apparatus 44 exceeds a predetermined value, pressure-limiting valve 50 opens so that a portion of the hydraulic fluid flows around cooling apparatus 44 through bypass line 48. Because the flow resistance of cooling apparatus 44 is a function of temperature based on the viscosity of the hydraulic fluid, the cooling of the hydraulic fluid is automatically adapted to what is required. When the hydraulic fluid is cold, the backpressure through the cooling apparatus is high. As a result pressure-limiting valve 50 opens even when the flow volume through the cooling apparatus is low. By contrast, when the hydraulic fluid is hot and a more intense cooling of the hydraulic fluid is needed, the back pressure via the cooling apparatus is lower, so that pressure-limiting valve 50 opens only when the flow volume through the cooling apparatus is higher. A cooling of the hydraulic fluid that is adapted to need is therefore achieved with the aid of pressure-limiting valve 50.

Clutches K1 and K2 are driven via a common pilot slide valve 70 whose position is controlled by means of an electromagnetic control valve 72 configured as a proportional valve. The application of pressure to positioning cylinders 14 and 16 of clutches K1 and K2 is accomplished individually via these assigned slide valves 74 and 76 through pilot slide valve 70, the positioning of slide valves 74 and 76 being accomplished via control valves 78 and 80, which are configured as proportional valves. The driving of the clutches is known in and of itself and is therefore not explained in detail.

As is further evident from FIG. 2, with all control valves the control pressure prevalent in control pressure line 52 is either directly applied to the control chambers of the slide valves being driven or the control chamber is depressurized by the opening of the particular control valve, a throttle being disposed between control pressure line 52 and the particular connection line between the control chamber of the slide valve and the control valve. Advantageously, the hydraulic fluid flowing through return line 46 does not flow directly back into a reservoir, rather, the fluid flowing out of an outlet 82 of the return line is used for cooling the clutches.

In FIG. 2, a housing, in which the individual routing paths are formed and in which or on which the particular valves are mounted, is indicated by dot-and-dash lines. The electromagnets of the control valves are connected with the outlets of control device 24 according to FIG. 1. Lines (exit lines 22 of FIG. 1) exit from the housing or the assembly module to the clutches, the cooling apparatus, the shift cylinders and for cooling of the clutches. A line exiting an hydraulic fluid reservoir leads to pump 30, which is mounted as a separate assembly on the housing.

The described device may be altered in many ways. The pressure-regulating valve 40 is advantageously located in the direct vicinity of the pump. The slide valves may be configured in such a way that its outlet to which no pressure is applied at the time is open to a back flow. The pilot pressure valve may be omitted if operation is without pilot control.

Figure 3:
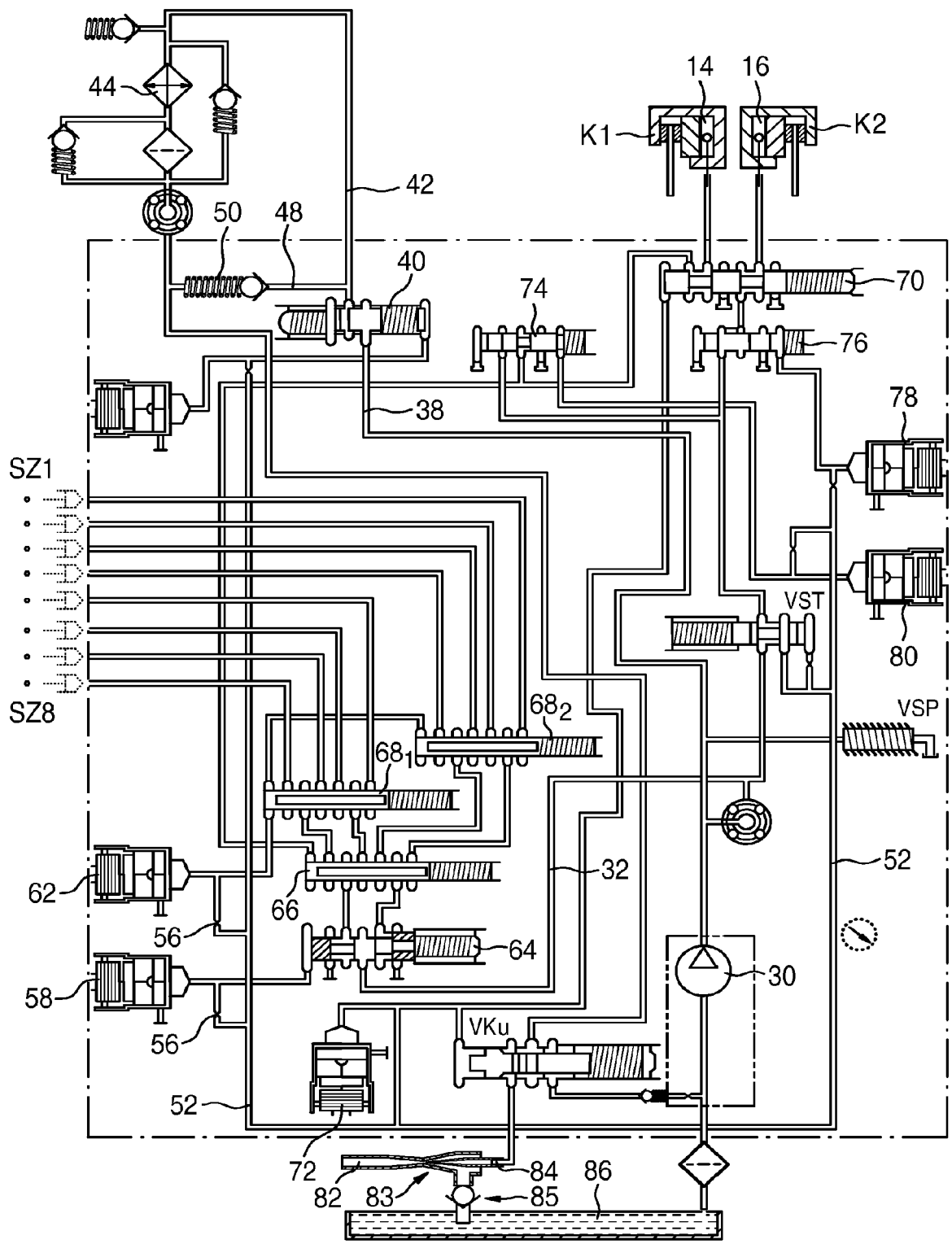
FIG. 3 shows a circuit diagram of another embodiment of an hydraulic system for the actuation of a twin clutch transmission.

FIG. 3 shows an embodiment of the hydraulic system that is altered in comparison to FIG. 2. The essential change is the omission of control valve 60 and the driving of the control chamber of slide valve 66 directly with the hydraulic pressure supplied to clutch K1.

As explained above, a principle of the twin clutch transmission (FIG. 1) is to install the even gears in one of the partial transmissions and the odd gears in the other of the partial transmissions. One of clutches K1 and K2 is assigned to each of the two partial transmissions. While driving, for example, in an even gear, the next or preceding gear is pre-selected. This occurs while the clutch of the partial transmission having the even gears is engaged. Analogously, while driving in an odd gear, one of the even gears is pre-selected.

If, for example, clutch K1, which is assigned to the even gears, i.e., clutch K1 is engaged if the car is driving in an even gear, then only one of the odd gears is pre-selected, i.e. one of the accompanying shift cylinders is operated, when clutch K1 is engaged. If, as illustrated in FIG. 3, hydraulic fluid supplied to clutch K1 is supplied to the control chamber of slide valve 66, its slide is located in the right-hand position, so that pressure may be selectively applied only to the two right-hand outlets of slide valve $68_1$ and $68_2$, as pressure is applied to the control chambers of slide valves 64 and $68_1$ as well as $68_2$. In this way it is possible to actuate one of shift cylinders SZ1, SZ2 or SZ5, SZ6. These shift cylinders are assigned to the transmission section having uneven gears. In the reverse situation, one of the other shift cylinders may be actuated if clutch K1 is depressurized.

In the design according to FIG. 3, it is thereby possible to have one less control valve than in FIG. 2.

An additional device according to the invention for driving a plurality of hydraulic shift cylinders is explained with reference to FIGS. 4 to 8. In this context the same reference characters as in FIGS. 2 and 3 are used for the components that are similar to those of FIGS. 2 and 3.

Figure 4:
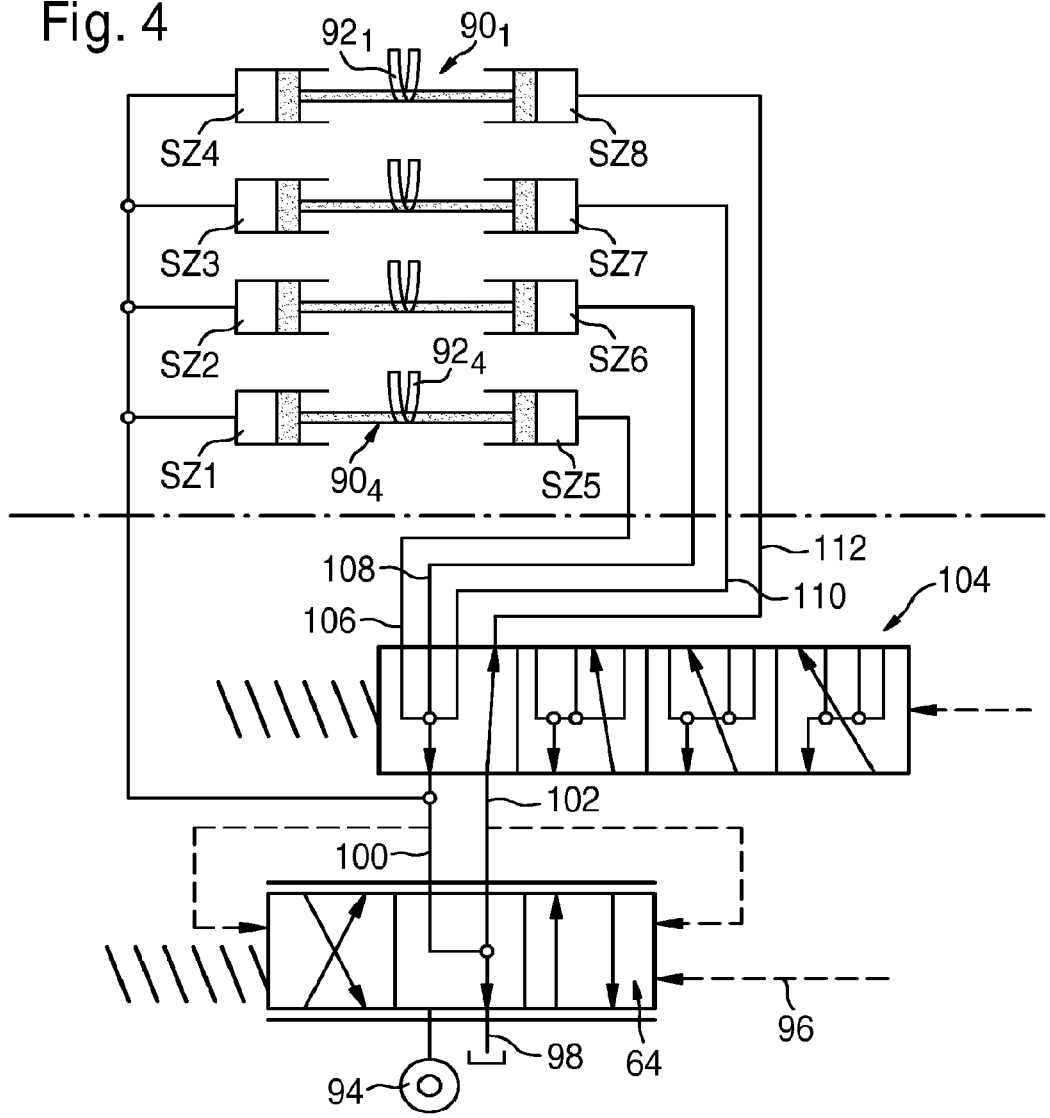
FIG. 4 shows a hydraulic diagram of a modified embodiment of a device according to the invention.

According to FIG. 4, which shows an hydraulic concept of the device of the invention, four shift assemblies $90_1$ to $90_4$, each of which has two shift cylinders SZ1 to SZ8 acting in opposite directions, are to be shifted. Each shift assembly 90 includes a shift fork 92, which advantageously may be shifted to the right or the left from a central neutral position.

To control the shift cylinder, a 4-by-3-way valve that corresponds to first slide valve 64 of FIGS. 2 and 3 is provided. Slide valve 64 has an intake 94 to which system pressure may be applied, a control intake 96 to which control pressure may be applied, a return outlet 98 and two outlets 98 and 100 that are connected to system pressure intake 94 or return outlet 98 as a function of pressure application to control intake 96.

The two outlets 100 and 102 of first slide valve 64 are connected to a 6-by-4-way valve 104 whose outlets 106, 108, 110 and 112 are connected to shift cylinders SZ5, SZ6, SZ7 and 20 SZ8. Another outlet of the 6-by-4-way valve 104, which simultaneously forms intake 100, is jointly connected as a shared outlet with shift cylinders SZ1, SZ2, SZ3 and SZ4.

Thus, in the illustrated example, the leftward-acting shift cylinder according to FIG. 4 is connected to individual outlets of the 6-by-4-way valve, where, by contrast, the rightward-acting shift cylinders are connected to the shared outlet.

The structure of the 6-by-4-way valve 104 is such that it shifts the system pressure either to one of shift cylinders SZ5, SZ6, SZ7 and SZ8, so that the corresponding shift fork is pushed leftward, or shifts the system pressure to each of seven shift cylinders and connects the eighth shift cylinder to return outlet 98. The associated shift fork is then shifted to the right.

One advantage of the depicted concept lies in the low number of solenoid valves (in depicted example 5) and in the possibility of controlling the eight shift cylinders in the depicted example, of which two actuate each shift fork, with only five pressure ports.

Figure 5:
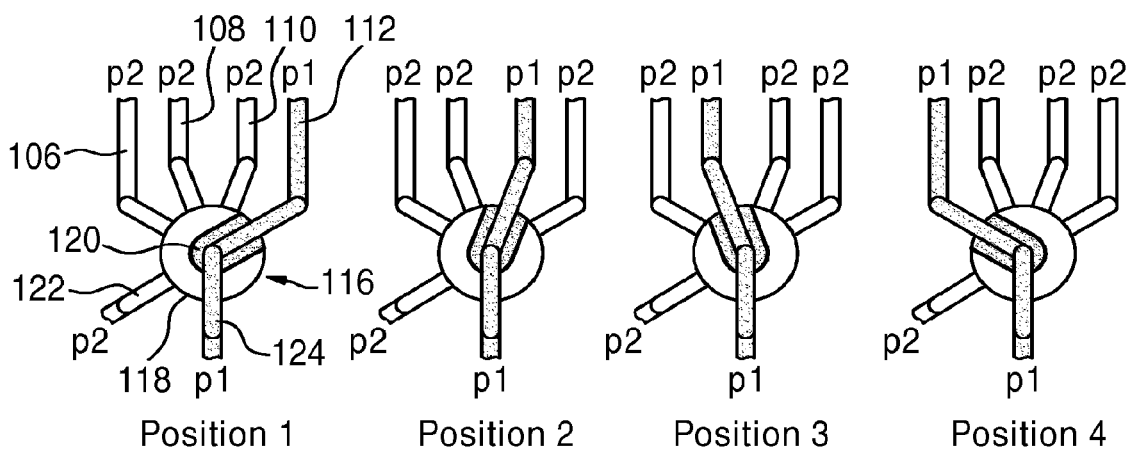
FIG. 5 shows a rotary valve in four different positions.

FIG. 5 shows a rotary slide valve, which is suitable as a 6-by-4-way valve, simple in its structure and designated as a whole with reference character 116, in four different positions.

Rotary slide valve 116 has a housing 118, inside of which a rotary slide 120 is rotatably mounted. The housing also has a total of six ports, to which the four outlets 106, 108, 110 and 112 at the top of FIG. 5 correspond, another outlet corresponds to the intake or shared outlet 122 that is connected to outlet 100 of slide valve 64 of FIG. 4, and another port forms an intake 124 that is connected to outlet 102 of slide valve 64 of FIG. 4.

Rotary slide 120 may be rotated into the four different positions depicted in FIG. 5, in which it selectively connects intake 124 to one of outlets 106, 108, 110 and 112. P1 designates a pressure level that corresponds, for example, to the pressure level in FIG. 5; P2 designates an essentially depressurized pressure state that is connected to return port 98. Pressure level P2 must not be zero; it is important that the two pressure levels are different.

As is immediately evident, system pressure P1 is applied to one of shift cylinders SZ5 to SZ8 (FIG. 4) in the four depicted positions, where, by contrast, the low pressure P2 in the depicted example is applied to all seven other shift cylinders, or they are depressurized.

If, by switching slide valve 64, intake 124 is connected to return outlet 98 and system pressure is applied to intake 122, the ratios reverse; low pressure is applied to each one of shift cylinders SZ5 to SZ8, whereas system pressure is applied all other shift cylinders.

Figure 6:
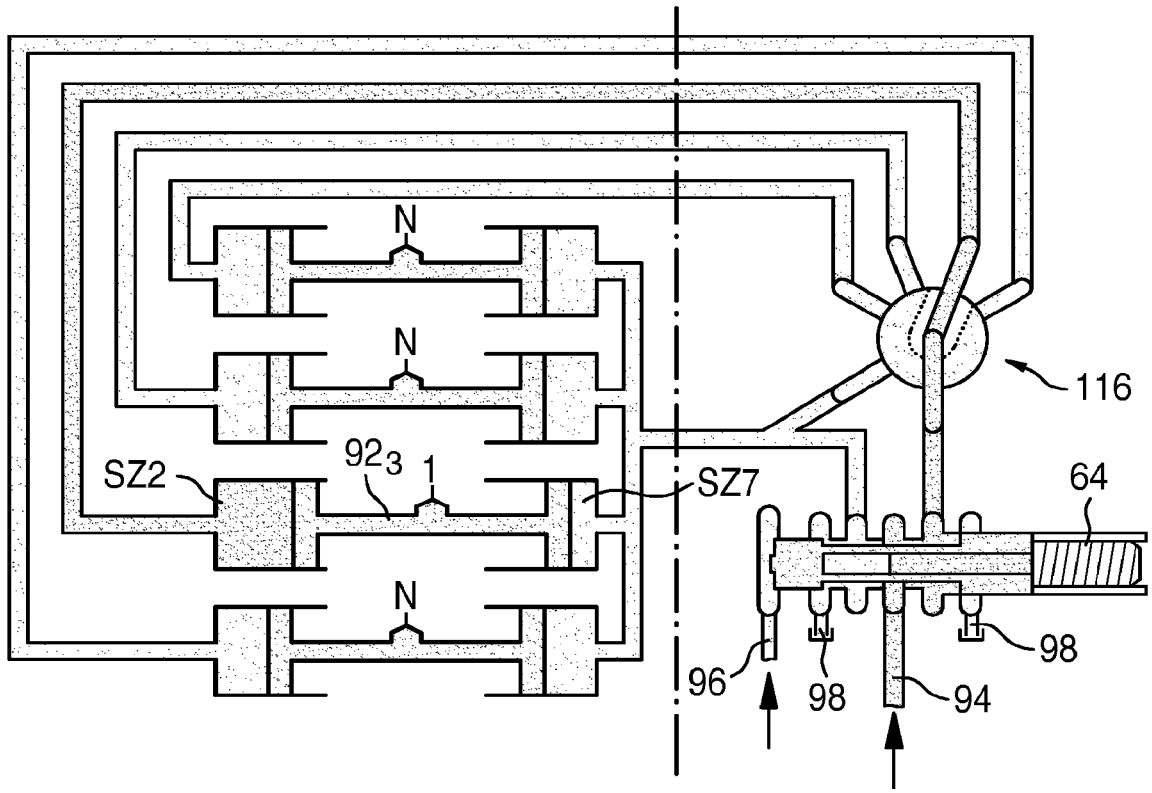
FIG. 6 shows a first state of shift assemblies being driven with the rotary valve according to FIG. 5.
Figure 7:
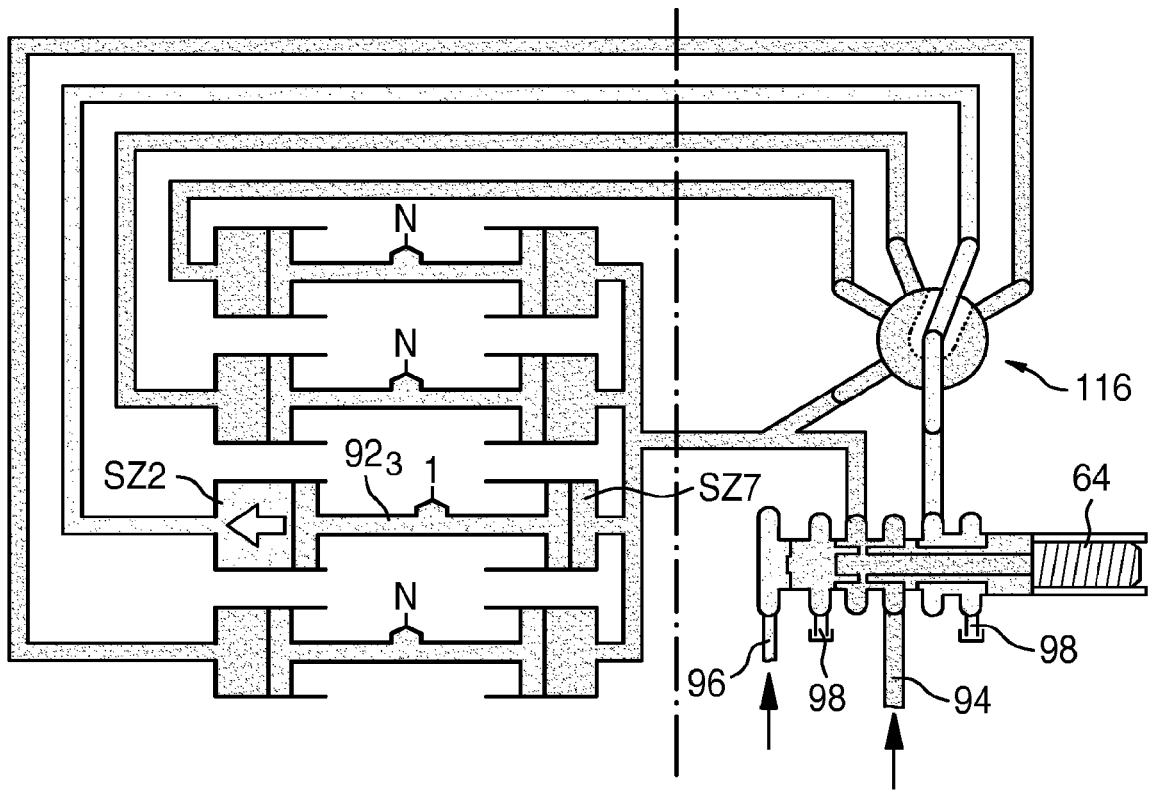
FIG. 7 shows a shift state of the system that is altered in relation to FIG. 6.

FIGS. 6 and 7 depict the described ratios by way of example. In FIGS. 6 and 7, system pressure is applied to each of the darker drawn lines, while the low return pressure is applied to the lighter drawn lines.

In the depicted example, system pressure is applied to shift cylinder 2 in the positions shown in FIG. 6, whereas all other shift cylinders are depressurized. In the depicted example of shift cylinder 2, this causes shift fork 92₃ to move rightward, so that the first gear of a twin-clutch transmission is engaged in the depicted example. The same low pressure is applied to all of the shift cylinders of the other actuation assemblies, so that the associated shift forks are located in the neutral position.

In the state depicted in FIG. 7, shift valve 64 is switched so that shift cylinder 2 is now under low pressure and shift cylinder 7, together with the remaining shift cylinders, is under system pressure. Shift fork $92_3$ is moved leftward for the disengagement of the first gear. The same high system pressure is applied to all of the shift cylinders of the other shift assemblies, so that their shift forks are located in the neutral position.

A rotary slide valve, like rotary slide valve 116, which forms a 6-by-4-way valve, may be simply operated, for example, by a stepping motor, whereby the associated limit positions (positions 1 and 4 of FIG. 5) may be positions of stops and the intermediate positions are approached in a controlled or regulated manner and advantageously monitored. By using a stepping motor, additional position or travel sensors for the regulation of positions 2 and 3 may be omitted.

Combining a solenoid valve with an axial slide makes up a further possibility for turning rotary slide 120.

Figure 8:
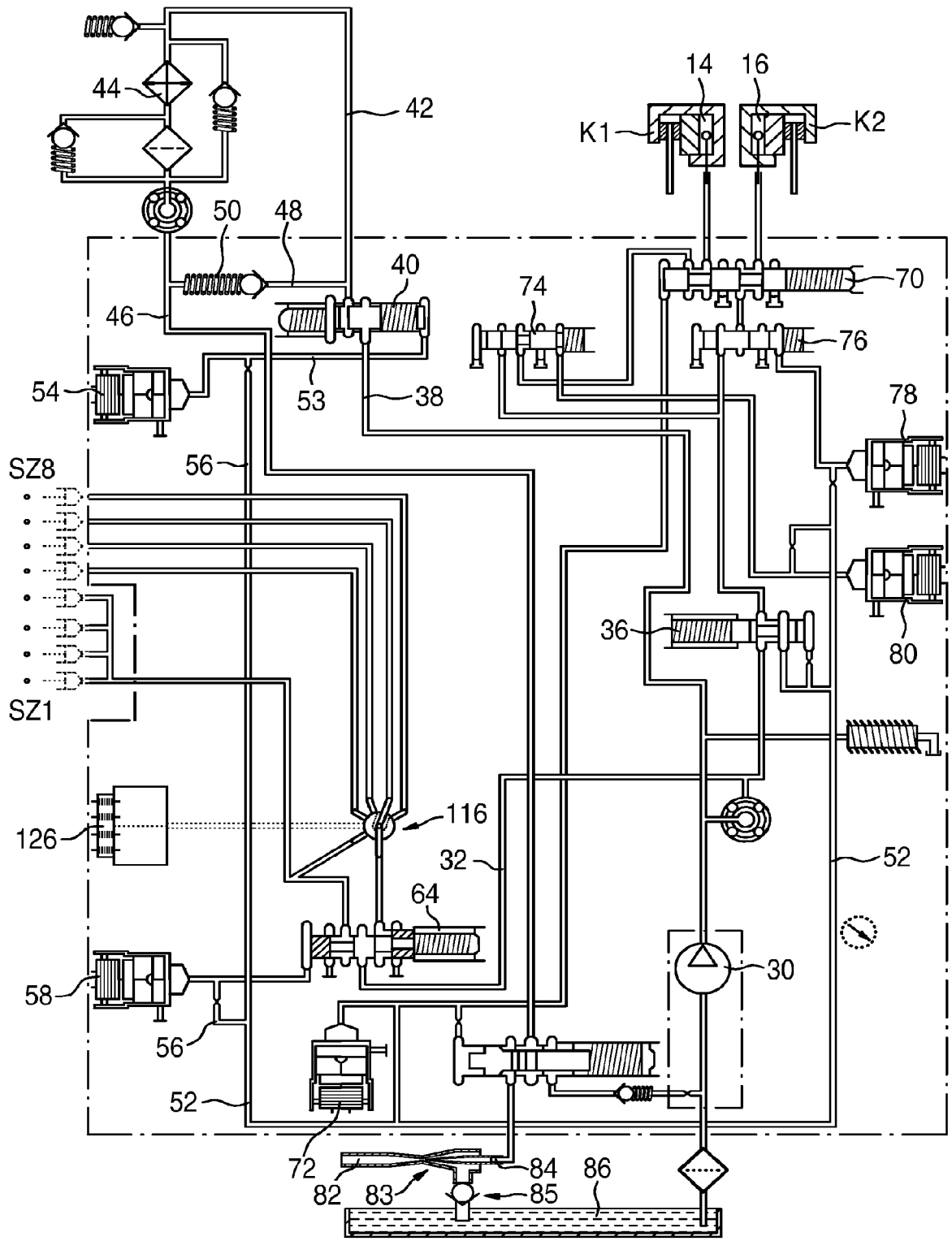
FIG. 8 shows an illustration of a circuit diagram corresponding to FIG. 2 where the rotary valve is being used.

FIG. 8 shows an overall hydraulic circuit diagram corresponding to the illustrations of FIG. 2 using rotary slide valve 116. As is evident, rotary slide valve 116, controlled by a stepping motor 126, replaces slide valves 66 and 68 of FIG. 3.

According to another embodiment of the invention, the frictional surfaces of a twin-clutch transmission may be cooled via a flow of coolant, whereby the flow of coolant may be made up of a portion driven by pressure and a portion sucked out of the sump by means of a fluid entrainment pump. For this purpose in FIGS. 2, 3 and 8, a jet pump of this type is diagrammatically illustrated that is fed by a pressure supply flow 83 and coolant is transported through an outlet 82 and corresponding supply lines to the friction linings of clutches K1 and K2, additional coolant being suctioned out of sump 86 through feed line 84 against the action of a check valve 85 as a function of the adjustable flow volume. The adjustment of the flow volume through supply line 84 may thus occur as a function of the friction loss of clutches K1 and K2. The slip of the clutches, the transmitted torque, the temperature of the coolant returning from the clutches and the like may be used, for example, as a parameter for the determination of the friction loss.

PARTS LIST

6 Drive Shaft
8 Input Shaft
10 Input Shaft
12 Output Shaft
14 Positioning cylinder
16 Positioning cylinder
17 Partial transmission
18 Partial transmission
20 Electrohydraulic assembly
22 Outlet lines
24 Control device
26 Intakes
30 Pump
32 Line
36 Pilot Pressure valve
38 Line
40 Pressure-regulating valve
42 Cooling line
44 Cooling apparatus
46 Return line
48 Bypass line
50 Pressure-limiting valve
52 Pilot pressure line
53 Line
54 Control valve
56 Throttle
58 Control valve
60 Control valve
62 Control valve
64 Slide valve
66 Slide valve
68₁ Slide valve 68₂ Slide valve
70 Pilot slide valve
72 Control valve
74 Slide valve
76 Control valve
78 Control valve
80 Control valve
82 Outlet
83 Fluid entrainment pump
84 Supply line
85 Check valve
86 Sump
90 Shift assembly
92 Shift fork
94 System pressure intake
96 Control intake
98 Return outlet
100 Outlet
102 Outlet
104 b 6-by-4-way valve
106 Outlet
108 Outlet
110 Outlet
112 Outlet
116 Rotary slide valve
118 Housing
120 Rotary slide 122 Shared outlet 124 Intake

What is claimed is:

1. A device for driving a plurality of hydraulic shift cylinders (SZ1-SZ8) for shifting gears of a twin-clutch transmission, comprising:
   a first hydraulic slide valve (64) having a control intake (96) to which fluid is applied to create control pressure;
   a system pressure intake (94) to which system pressure is applied;
   first and second outlets (100, 102) and at least one return outlet (98), wherein the first outlet is connected to the system pressure intake and the second outlet to the return outlet as a function of the pressure applied to the control intake; and
   a valve device (66, 68, 104, 116) connected to the first and second outlets of the slide valve by means of which the shift cylinders may be selectively actuated.

2. The device as described in claim 1, wherein the valve device is formed by slide valves (66, 68) having respective intakes and outlets and slides that are movable into a first or second position in response to an application of control pressure, wherein to each said intake of the slide valves are assigned two outlets, one of which is connected to the intake in the first position of the slide and the other in the second position of the slide, these slide valves being disposed one behind the other in the manner of a cascade such that an intake of a slide valve of a subordinate step is connected to an outlet of a slide valve of the preceding step, wherein the first slide valve (58) forms the first step, and the outlets of the slide valves of the last step are connected to a shift cylinder (SZ1, . . . SZ8), and control devices (58, 60, 62; 58, 62, 74) are provided by which each one of the slide valves is assigned to a step so that control pressure may be simultaneously applied to all slide valves of a step.

3. The device as described in claim 2, wherein:
   the second step of the cascade includes one slide valve (66) having two intakes and four outlets; and
   a third step includes two slide valves (68₁, 68₂) having two intakes and four outlets each.

4. The device as described in claim 2, wherein at least some of the control devices are formed by electromagnetically operable control valves (58, 60, 62).

5. The device as described in claim 4, wherein a pilot pressure line (52) is connected via a throttle (56) to a connection line between a control valve (58, 60, 62) and a control chamber of a slide valve (64, 66, 68).

6. The device as described in claim 3 for driving a plurality of hydraulic shift cylinders for shifting gears of a twin-clutch transmission, wherein the outlets of the third step that are connectable to the intake of the slide valve (66) of the second step are connected to shift cylinders with which a first group of gears of the twin clutch transmission may be shifted, and the outlets of the third step that are connectable to the other intake of the slide valve of the second step are connected to shift cylinders with which a second group of gears may be shifted.

7. The device as described in claim 6, wherein the control device for operating the slide valve (66) of the second step is formed by a connection of a control chamber of the slide valve to an hydraulic line, via which one of the clutches (K1, K2) of the twin-clutch transmission may be actuated by application of pressure.

8. The device as described in claim 1, further comprising actuation assemblies and wherein:
   two opposite-acting shift cylinders are combined with one shifting component (92) into one shift assembly (90);
   the valve device includes a multi-port valve (104; 116) to which control pressure may be applied having individual outlets (106, 108, 110, 112) assigned to each one of the shift cylinders of a shift assembly and a shared outlet (122) commonly assigned to the other shift cylinders of the actuation assemblies; and
   the multi-port valve, depending on the position of the first slide valve (64) selectively guides the system pressure to one of the individual outlets and in the process connects all other shift cylinders to the return outlet and thereby applies system pressure to all other outlets.

9. The device as described in claim 8, wherein the multi-port valve is a rotary slide valve (116) whose rotary slide (120) selectively connects an intake connected to an outlet of the first slide valve (64) to one of the individual outlets (106, 108, 110, 112) and its shared outlet (122) simultaneously forms the other intake of the rotary slide valve that is connected to the other outlet of the first slide valve.

10. Hydraulic supply system for a twin-clutch transmission containing a device as described in claim 1, including:
   a line (38) to which pressure from a pump (30) may be applied that is connected to a pressure-regulating valve (40), which has a connection for a pilot pressure line (52) connected to the control device(s) (58, 60, 62) and a return connection that is connected to a return line (46) via a cooling line (42) routed through a cooling apparatus (44);
   a bypass line (48) that connects the cooling line to the return line; and
   a pressure-limiting valve (50) that opens the flow cross-section of the bypass line as the back pressure at the cooling apparatus increases.

11. The hydraulic system as described in claim 10, wherein at least a portion of the hydraulic fluid flowing through the return line is used to cool the clutches (K1, K2).

12. The device as described in claim 1 wherein a line (84) to which a pressure medium is applied before being supplied to a depressurized sump (86) while being linked to a jet pump (83) of at least one clutch (K1, K2) for cooling, the jet pump (83) suctioning additional coolant from the sump (86) against the action of a check valve (85) that is connected to the sump (86) as a function of the flow volume of pressure medium that is transported in the line (84) for cooling the at least one clutch (K1, K2).

* * * * *